US007955699B2

(12) United States Patent
Handa et al.

(10) Patent No.: US 7,955,699 B2
(45) Date of Patent: Jun. 7, 2011

(54) COMPOSITE MATERIAL

(75) Inventors: Koichi Handa, Tokyo (JP); Subiantoro, Tokyo (JP); Takayuki Tsukada, Tokyo (JP); Jiayi Shan, Tokyo (JP); Tsuyoshi Okubo, Tokyo (JP)

(73) Assignee: Hodogaya Chemical Co., Ltd, Tokyo (JP)

( * ) Notice: Subject to any disclaimer, the term of this patent is extended or adjusted under 35 U.S.C. 154(b) by 601 days.

(21) Appl. No.: 12/094,099

(22) PCT Filed: Nov. 17, 2006

(86) PCT No.: PCT/JP2006/322973
§ 371 (c)(1),
(2), (4) Date: May 16, 2008

(87) PCT Pub. No.: WO2007/058300
PCT Pub. Date: May 24, 2007

(65) Prior Publication Data
US 2011/0045273 A1  Feb. 24, 2011

(30) Foreign Application Priority Data

Nov. 18, 2005  (JP) ................. 2005-334889

(51) Int. Cl.
*B32B 9/00* (2006.01)
(52) U.S. Cl. ................. 428/408; 423/447.2; 428/297.4; 977/742
(58) Field of Classification Search ............... 428/297.4, 428/367, 408; 423/447.1, 447.2; 977/742
See application file for complete search history.

(56) References Cited

U.S. PATENT DOCUMENTS

| 5,643,502 | A  | * | 7/1997 | Nahass et al. ............... 252/511 |
| 6,099,965 | A  | * | 8/2000 | Tennent et al. .............. 428/408 |
| 7,214,430 | B2 | * | 5/2007 | Handa et al. ................ 428/408 |
| 7,824,768 | B2 | * | 11/2010 | Shan et al. .................. 428/370 |
| 2006/0215517 | A1 | * | 9/2006 | Hsu et al. ................... 369/47.53 |
| 2006/0216516 | A1 | * | 9/2006 | Handa et al. ................ 428/408 |
| 2010/0201023 | A1 | * | 8/2010 | Piccione et al. ............. 264/117 |
| 2010/0329966 | A1 | * | 12/2010 | Fugetsu ...................... 423/447.1 |

FOREIGN PATENT DOCUMENTS

| JP | 57-117623 A | 7/1982 |
| JP | 2862578 B2 | 12/1998 |
| JP | 2002-266170 A | 9/2002 |
| JP | 2003-81621 A | 3/2003 |
| JP | 2003-227039 A | 8/2003 |
| JP | 2004-119386 A | 2/2004 |
| JP | 2004-176244 A | 6/2004 |

* cited by examiner

*Primary Examiner* — N. Edwards
(74) *Attorney, Agent, or Firm* — Sughrue Mion, PLLC

(57) ABSTRACT

An composite material is disclosed, which includes carbon fibrous structures which are capable of being included in a relatively large amount in the composite material, and which are capable of improving the physical properties, such as electric, mechanical, or thermal properties.

The carbon fibrous structure comprises (a) carbon fibrous structures each of which comprises a three dimensional network of carbon fibers, each of the carbon fibers having an outside diameter of 15-100 nm, wherein the carbon fibrous structure further comprises a granular part, at which the carbon fibers are bound in a state that the carbon fibers are extended outwardly therefrom, and wherein the granular part is produced in a growth process of the carbon fibers, and (b) an material other than the carbon fibrous structures, wherein the amount of carbon fibrous structures added is more than 30% and not more than 100% by weight of the total weight of the composite.

11 Claims, 7 Drawing Sheets

COMPOSITE MATERIAL

TECHNICAL FIELD

This invention relates to a new composite material. Particularly, this invention relates to a composite material, which comprises fine carbon fibrous structures blended in a matrix, the fine carbon fibrous structures being of flexible, and having high strength and toughness with a specific structure.

BACKGROUND ART

To date, composite preparations comprising plural materials have been developed in order to attain unique characteristics that are not found in any single material. As a composite material, glass fiber-reinforced plastic had been widely used. Particularly, the development of carbon fibers and carbon fiber reinforced plastics (CFRP) has brought such composite materials into general use.

These composite materials have been widely used in sporting goods and so on, and have also gained much attention as light weight-, high intensity- and high elastic modulus-structural materials for aircrafts. In addition to the fiber-reinforced materials mentioned above, composite materials reinforced with fine particles have also been successfully developed. Composite materials, while generally regarded as structural materials for their structural properties such as strength and heat resistance, are increasingly being recognized as functional materials for their electrical, electronic, optical, and chemical characteristics.

As the prevalence of various electronic devices increases, problems such as malfunction of devices caused by static electricity and electromagnetic wave interference caused by noises from certain electronic components are also on the rise, thus creating an increased demand for materials that have excellent functional characteristics such as conductivities and damping abilities.

Traditional conductive polymer materials currently in wide use are made by blending highly conductive fillers with low conductive polymers. In such materials, metallic fibers, metallic powders, carbon black, carbon fibers and other similar materials are generally used as conductive fillers. However, when using metallic fibers and metallic powders as the conductive filler, the materials thus obtained have poor corrosion resistance and mechanical strength. When using carbon fibers as the conductive filler, although a predetermined strength and elastic modulus may be obtained by adding relatively large amounts of the filler, electrical conductivity generally cannot be greatly enhanced by this approach. If one attempts to attain a predetermined conductivity by adding a large amount of filler, one would invariably degrade the intrinsic properties of the original polymer material. Incidentally, with respect to a carbon fiber, it is expected that the conductivity-imparting effect increases as its diameter becomes smaller at an equivalent additive amount, because the contact area between the fiber and the matrix polymer increases.

Carbon fibers may be manufactured by subjecting a precursor organic polymer, particularly, a continuous filament of cellulose or polyacrylonitrile, to thermal decomposition under a controlled condition, in which a forced tension on the precursor polymer is carefully maintained in order to achieve a good orientation of anisotropic sheets of carbon in the final product. In such manufacturing processes, the level of material loss during carbonization is high and the carbonization rate is slow. Therefore, carbon fibers made by these processes tend to be expensive.

In recent years, a different class of carbon fibers, known as urtrathin carbon fibers such as carbon nano structures, exemplified by the carbon nanotubes (hereinafter, referred to also as "CNT"), has become a focus of attention.

The graphite layers that make up the carbon nano structures are materials normally comprised of regular arrays of six-membered ring carbon networks, which bring about unique electrical properties, as well as chemical, mechanical, and thermal stabilities. As long as such urtrathin carbon fibers can retain such properties upon blending and dispersion in a solid material, including various resins, ceramics, metals, etc., or in liquid materials, including fuels, lubricant agents, etc., their usefulness as additives for improving material properties can be expected.

On the other hand, however, such fine carbon fibers unfortunately show an aggregate state even just after their synthesis. When these aggregates are used as-is, the fine carbon fibers would be poorly disperse, and thus the product obtained would not benefit from the desired properties of the nano structures. Accordingly, given a desired property such as electric conductivity for a matrix such as a resin, it is necessary that the fine carbon fibers would be added in a large amount.

Patent Literature 1 discloses a resin composition comprising aggregates wherein each of the aggregate is composed of mutually entangled carbon fibrils having 3.5-70 nit in diameter, and wherein the aggregates possess a diameter in the range of 0.10 to 0.25 mm with a maximum diameter of not more than 0.25 mm. It is noted that the numeric data such as the maximum diameter, diameter, etc., for the carbon fibril aggregates are those measured prior to combining with a resin, as is clear from the descriptions in the examples and other parts of the Patent Literature 1.

Patent Literature 2 discloses a composite material where a carbon fibrous material is added to the matrix, the carbon fibrous material mainly comprising aggregates each of which is composed of carbon fibers having 50-5000 nm in diameter, the mutual contacting points among the carbon fibers being fixed with carbonized carbonaceous substance, and each aggregates having a size of 5 μm-500 μm. In the Patent Literature 2, the numeric data such as the size of aggregate, etc., are those measured prior to the combining into resin, too.

Using carbon fiber aggregates such as described above, it is expected that the dispersibility of carbon nano structures within a resin matrix will improve to a certain degree as compared to that of using bigger lumps of carbon fibers. The aggregates prepared by dispersing carbon fibrils under a certain shearing force, such as in a vibrating ball mill or the like according to the Patent Literature 1, however, have relatively high bulk densities. Thus, they do not fulfill the need for ideal additives that is capable of improving various characteristics, such as electric conductivity, of a matrix effectively at minuscule dosages.

The Patent Literature 2 discloses a carbon fibrous structure which is manufactured by heating carbon fibers in a state such that mutual contacting points among the carbon fibers are formed by compression molding after synthesis of the carbon fibers, and wherein fixing of fibers at the contacting points is done by carbonization of organic residues primarily attached to the surface of the carbon fibers, or carbonization of an organic compound additionally added as a binder. Since fixing of carbon fibers is performed by such a heat treatment after synthesis of the carbon fibers, the affixing forces at the contacting points are weak and do not result in good electrical properties of the carbon fibrous structures. When these carbon fibrous structures are added to a matrix such as a resin, the carbon fibers fixed at the contacting points are easily detached from each other, and the carbon fibrous structures are no longer maintained in the matrix.

Incidentally, as the composite material described above, structural materials which needs high mechanical strength such as stiffness even granting that the formability is sacrificed to a certain extent, and materials which needs high electrical conductivity such as material for electrodes are involved in general. However, a large volume addition of the above mentioned carbon fibers or carbon fiber aggregates into the matrix, per se, is very difficult. Further, even if the products can be manufactured with such a high content of the carbon fibers or carbon fiber aggregates, the properties of the products thus obtained would be far from the intended ones.
[Patent Literature 1] Japanese patent No. 2862578
[Patent Literature 2] JP-2004-119386A

DISCLOSURE OF TEE INVENTION

Problems to be Solved by this Invention

Therefore, this invention aims to provide a composite material which includes a large amount of new carbon fibrous structures which have specific fibrous structures, which own physical properties suitable far filler of composite material, which are capable of being included in a relatively large amount in the composite material, and which are capable of improving the physical properties, such as electric, mechanical, or thermal properties.

Means for Solving the Problems

As a result of our intensive study for solving the above problems, we, the inventors, have found that, in order to blend the filler stably even in a relatively large adding amount and give a sufficient improvement on the properties of the composite material, the effective things are to adapt carbon fibers having a diameter as small as possible; to make an sparse structure of the carbon fibers where the fibers are mutually combined tightly so that the fibers do not behave individually; and to adapt as the carbon fibers per se ones which are designed to have a minimum amount of defects, and finally, we have accomplished the present invention.

The present invention for solving the above mentioned problems is, therefore, a composite material comprising (a) carbon fibrous structures each of which comprises a three dimensional network of carbon fibers, each of the carbon fibers having an outside diameter of 15-100 nm, wherein the carbon fibrous structure further comprises a granular part, at which the carbon fibers are bound in a state that the carbon fibers are extended outwardly therefrom, and wherein the granular part is produced in a growth process of the carbon fibers, and (b) an material other than the carbon fibrous structures (hereinafter, referred to as "other material"), wherein the amount of carbon fibrous structures added is more than 30% and not more than 100% by weight of the total weight of the composite.

The present invention also discloses the above mentioned composite material, wherein the carbon fibrous structures may have an area-based circle-equivalent mean diameter of 50-100 μm.

The present invention also discloses the above mentioned composite material, wherein the carbon fibrous structures may have a bulk density of 0.0001-0.05 g/cm$^3$.

The present invention also discloses the above mentioned composite material, wherein the carbon fibrous structures may have an $I_D/I_G$ ratio determined by Raman spectroscopy (measured using 514 nm of argon laser) of not more than 0.2.

The present invention further discloses the above mentioned composite material, wherein the carbon fibrous structures may have a combustion initiation temperature in air of not less than 750° C.

The present invention further discloses the above mentioned composite material, wherein the particle diameter of the granular part at a binding portion for carbon fibers is larger than the outside diameters of the carbon fibers.

The present invention further discloses the above mentioned composite material, wherein the carbon fibrous structures are produced using as carbon sources of at least two carbon compounds, which have different decomposition temperatures.

The present invention further discloses the above mentioned composite material, wherein the other material comprises an organic polymer.

The present invention also discloses the above mentioned composite material, wherein the other material comprises an inorganic material.

The present invention further more discloses the above mentioned composite material, wherein the other material comprises a metal.

The present invention further discloses the above mentioned composite material, wherein the other material further includes at least one of filler selected from the group consisting of metallic fine particles, silica, calcium carbonate, magnesium carbonate, carbon black, glass fiber and carbon fibers in the matrix.

Effects of the Invention

According to the present invention, since the carbon fibrous structures are comprised of three dimensionally configured carbon fibers having ultrathin diameters and bound together by a granular part produced in a growth process of the carbon fibers so that said carbon fibers extend outwardly from the granular part, the carbon fibrous structures can disperse readily in the composite material upon adding, while maintaining their bulky structure. Thus, even when they are added in a relatively large amount, they can be distributed uniformly over the composite material. With respect to the electrical properties of the composite material according to the present invention, since it is possible to disperse fine carbon fibers of the carbon fibrous structures stably and uniformly in the composite material even when the above mentioned carbon fibrous materials are added in a relatively large amount, it is possible to obtain good electric conductive paths throughout the composite material, and to improve the electrical conductivity. With respect to the mechanical and thermal properties, improvements can be expected in analogous fashions, since the carbon fibrous structures are distributed evenly as fillers throughout the composite material. Therefore, by this invention, composite materials can be obtained that are useful as functional materials having good electric conductivity, electric wave shielding ability, heat conductivity, etc., or as structural materials having a high strength, or the like.

EXPLANATION OF NUMERALS

1 Generation furnace
2 Inlet nozzle
3 Collision member
4 Raw material supply port
a Inner diameter of inlet nozzle
b Inner diameter of generation furnace
c Inner diameter of collision member
d Distance from upper end of generation furnace to raw material mixture gas supply port
e Distance from raw material mixture gas supply port to lower end of collision member
f Distance from raw material mixture gas supply port to lower end of generation furnace

BEST MOUE FOR CARRYING OUT THE INVENTION

Now, the present invention will be described in detail with reference to some embodiments.

A composite material according to the present invention is characterized by the fact that it includes carbon fibrous structures, each of which has a three-dimensional network structure described later, in a relatively large amount.

Although the amount may depend on the intended usage of the composite material, the kind of the other material to be used in conjunction with the carbon fibrous structure, the molding procedure to be used, etc., it is preferable to be not more than 50% by weight based on the total weight of the composite material in the case of being molded by kneading procedure, in view of moldability. In the case of preform molding, it is preferable to be in the range of 40-90% by weight, more preferably, 50-80% by weight, based on the total weight of the composite material, in view of strength of molded article. As mentioned above, even when the adding amount of the carbon fibrous structures is as high as to exceed 30% by weight, the composite material according to the present invention can still exhibit an adequate moldability, and can enjoy superior mechanical properties, electrical properties, radio shielding property, thermal conductivity, etc.

Figure 3:
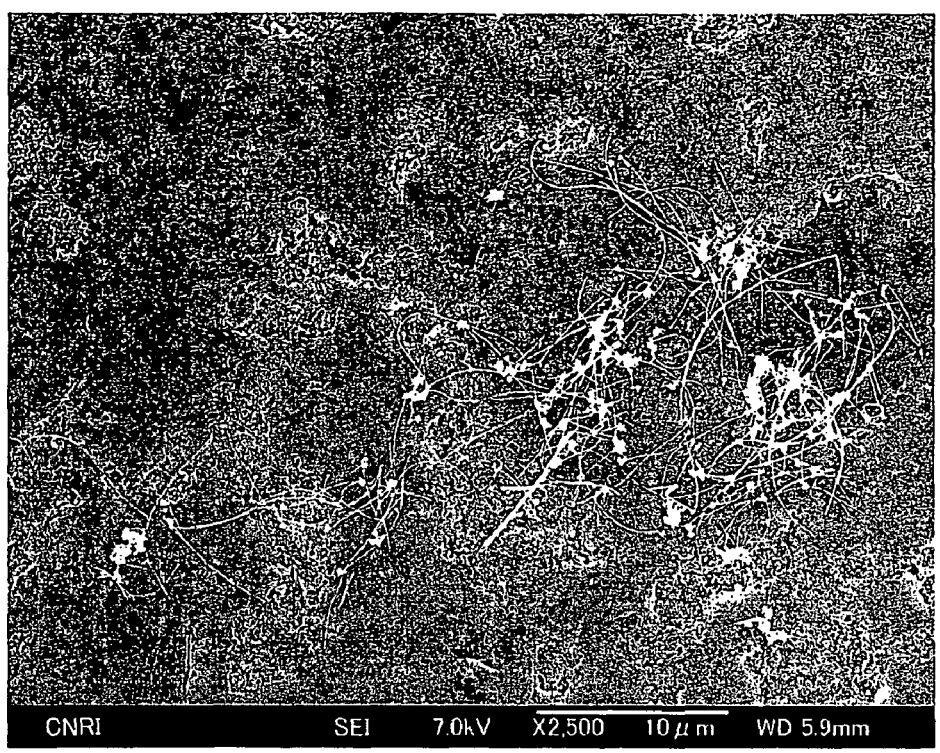
FIG. 3 is a SEM photo of a carbon fibrous structure used for a composite material according to the present invention.
Figure 4A:
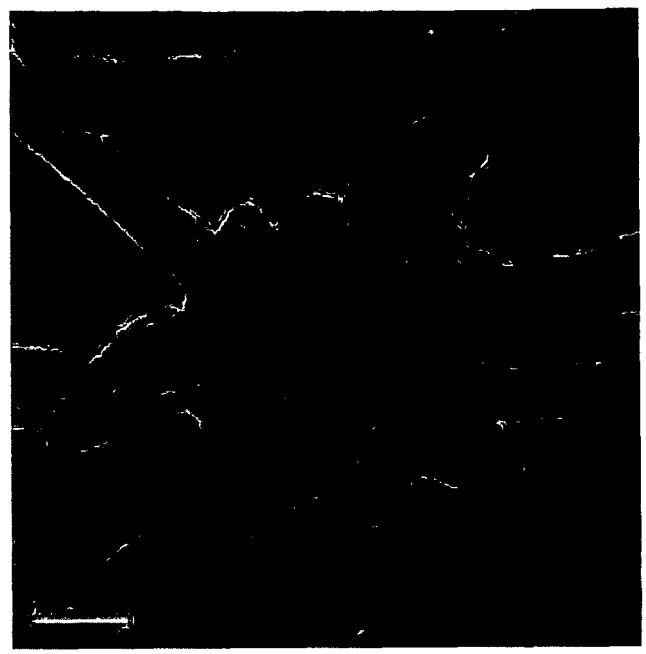
FIG. 4A and FIG. 4B are TEM photos of a carbon fibrous structure used for a composite material according to the present invention, respectively.
Figure 4B:
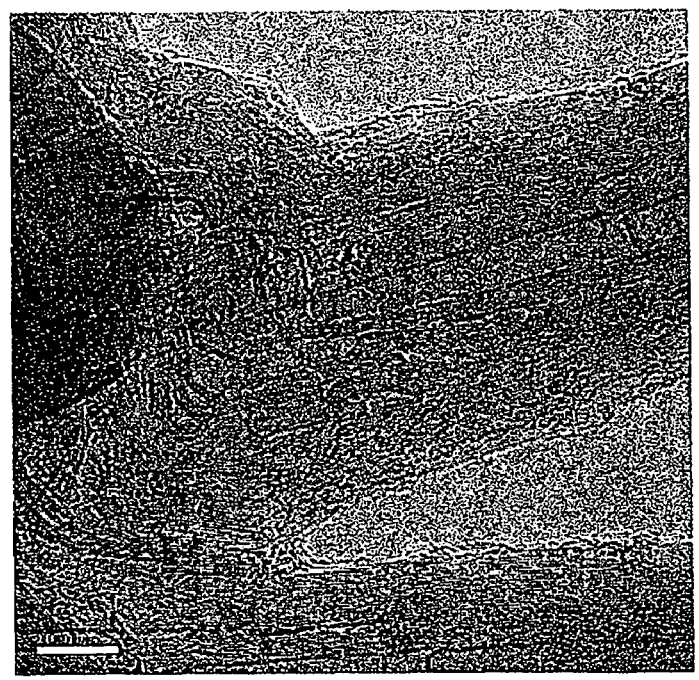

The carbon fibrous structure to be used in a composite material according to the present invention is, as shown in SEM photo of FIG. 3 or TEM photos of FIGS. 4A and 4B, composed of carbon fibers each having an outside diameter of 15-100 nm, and a granular part at which the carbon fibers are bound in a state so that said carbon fibers are externally elongated from the granular part.

The reason for restricting the outside diameter of the carbon fibers to a range of 15 not to 100 nm is because when the outside diameter is less than 15 nm, the cross-sections of the carbon fibers do not have polygonal figures as described later. According to physical properties, the smaller the diameter of a fiber, the greater the number of carbon fibers will be for the same weight and/or the longer the length in the axial direction of the carbon fiber. This property would be followed by an enhanced electric conductivity. Thus, carbon fibrous structures having an outside diameter exceeding 100 nm are not preferred for use as modifiers or additives for an other material such as a resin, etc. Particularly, it is more desirable for the outside diameter of the carbon fibers to be in the range of 20-70 nm. Carbon fibers that have a diameter within the preferable range and of which tubular graphene sheets are layered one by one in the direction that is orthogonal to the fiber axis, i.e., being of a multilayer type, can enjoy a high flexural rigidity and ample elasticity. In other words, such fibers would have a property of being easy to restore their original shape after undergoing any deformation. Therefore, these fibers tend to take a sparse structure in the matrix, even if the carbon fibrous structures have been compressed prior to being mixed into the other material such as resin.

Annealing at a temperature of not less than 2400° C. causes the carbon fibers to have polygonal cross-sections. Additionally, annealing lessens the spacing between the layered graphene sheets and increases the true density of the carbon fiber from 1.89 g/cm$^3$ to 2.1 g/cm$^3$. As a result, the carbon fibers become denser and have fewer defects in both the stacking direction and the surface direction of the graphene sheets that make up the carbon fiber, and their flexural rigidity (EI) and dispersibility in a resin can also be enhanced and improved.

Additionally, it is preferable that the outside diameter of a fine carbon fiber undergoes a change along the axial direction of the fiber. In the case that the outside diameter of the carbon fiber is not constant, but changes along the length of the fiber, it would be expected that some anchor effect may be provided to the carbon fiber at the interface with the other material, and thus migration of the carbon fibrous structure in the composite material can be restrained, leading to improved dispersion stability.

Thus, in a carbon fibrous structure according to the present invention, fine carbon fibers having a predetermined outside diameter configures the three dimensional network and are bound together by a granular part produced in a growth process of the carbon fibers so that the carbon fibers are externally elongated from the granular part. Since multiple fine carbon fibers are not only entangled with each other, but fused together at the granular part, the carbon fibers will not disperse as single fibers, but will be dispersed as bulky carbon fibrous structures when added to an other material such as a resin. Since the fine carbon fibers are bound together by a granular part produced in the growth process of the carbon fibers in a carbon fibrous structure according to the present invention, the carbon fibrous structure itself can enjoy superior properties such as electric property. For instance, when measuring electrical resistance under a certain pressed density, carbon fibrous structures according to the present invention have an extremely low resistivity, as compared with that of a simple aggregate of the fine carbon fibers and that of the carbon fibrous structures in which the fine carbon fibers are fixed at contacting points with a carbonaceous material or carbonized substance therefrom after the synthesis of the carbon fibers. Thus, when carbon fibrous structures are added and distributed in the composite material, they can form good conductive paths within the composite material.

Since the granular part is produced in the growth process of the carbon fibers as mentioned above, the carbon-carbon bonds in the granular part are well developed. Further, the granular part appears to include mixed state of $sp^2$- and $sp^3$-bonds, although it is not clear accurately. After the synthesis process (in the "first intermediate" and "second intermediate" described later in Synthetic Examples 1 and 2), the granular part and the fibrous parts are continuous mutually by virtue of a structure comprising patch-like sheets of carbon atoms laminated together. Further, after the high temperature treatment, at least a part of graphene layers constituting the granular part is continued on graphene layers constituting the fine carbon fibers elongated externally from the granular part, as shown in FIGS. 4A and 4B. In the carbon fibrous structure according to the present invention, as symbolized by such a fact that the graphene layers constituting the granular part is continued on the graphene layers constituting the fine carbon fibers, the granular part and the fine carbon fibers are linked together (at least in a part) by carbon crystalline structural bonds. Thus, strong couplings between the granular part and each fine carbon fiber are produced.

With respect to the carbon fibers, the condition of being "extended outwardly" from the granular part used herein means principally that the carbon fibers and granular part are linked together by carbon crystalline structural bonds as mentioned above, but does not means that they are apparently combined together by any additional binding agent (involving carbonaceous ones).

As traces of the fact that the granular part is produced in the growth process of the carbon fibers as mentioned above, the granular part has at least one catalyst particle or void therein, the void being formed due to the volatilization and elimination of the catalyst particle during the heating process after the generation process. The void (or catalyst particle) is essentially independent from hollow parts which are formed in individual fine carbon fibers which are extended outwardly from the granular part (although, a few voids which happened to be associated with the hollow part may be observed).

Although the number of the catalyst particles or voids is not particularly limited, it may be about 1-1000 a granular particle, more preferably, about 3-500 a granular particle. When the granular part is formed under the presence of catalyst particles the number of which is within the range mentioned above, the granular part formed can have a desirable size as mentioned later.

The per-unit size of the catalyst particle or void existing in the granular particle may be, for example, 1-100 nm, preferably, 2-40 nm, and more preferably, 3-15

Figure 2:
FIG. 2 is a TEM photo of a first intermediate for the carbon fibrous structure used for a composite material according to the present invention.

Furthermore, it is preferable that the diameter of the granular part is larger than the outside diameter of the carbon fibers as shown in FIG. 2. Concretely, for example, the diameter of granular part is 1.3-250 times larger than the outside diameter of the carbon fibers, preferably 1.5-100 times, and more preferably, 2.0-25 times larger, on average. When the granular part, which is the binding site of the carbon fibers, has a much larger particle diameter, that is, 1.3 times or more larger than the outer diameter of the carbon fibers, the carbon fibers that are externally elongated from the granular part have stronger binding force, and thus, even when the carbon fibrous structures are exposed to a relatively high shear stress during combining with an other material such as resin, they can be dispersed as maintaining its three-dimensional carbon fibrous structures into the obtained composite material. When the granular part has an extremely larger particle, diameter, that is, exceeding 250 times of the outer diameter of the carbon fibers, the undesirable possibility that the fibrous characteristics of the carbon fibrous structure are lost will arise. Therefore, the carbon fibrous structure will be not suitable for an additive or compounding agent in the composite material, and thus it is not desirable. The "particle diameter of the granular part" used herein is the value which is measured by assuming that the granular part, which is the binding site for the mutual carbon fibers, is one spherical particle.

Although the concrete value for the particle diameter of the granular part will be depended on the size of the carbon fibrous structure and the outer diameter of the fine carbon fiber in the carbon fibrous structure, for example, it may be 20-5000 nm, more preferably, 25-2000 nm, and most preferably, 30-500 nm, on average.

Furthermore, the granular part may be roughly globular in shape because the part is produced in the growth process of the carbon fibers as mentioned above. On average, the degree of roundness thereof may lay in the range of from 0.2 to <1, preferably, 0.5 to 0.99, and more preferably, 0.7 to 0.98.

Additionally, the binding of the carbon fibers at the granular part is very tight as compared with, for example, that in the structure in which mutual contacting points among the carbon fibers are fixed with carbonaceous material or carbonized substance therefrom. It is also because the granular part is produced in the growth process of the carbon fibers as mentioned above. Even under such a condition as to bring about breakages in the carbon fibers of the carbon fibrous structure, the granular part (the binding site) is maintained stably. Specifically, for example, when the carbon fibrous structures are dispersed in a liquid medium and then subjected to ultrasonic treatment with a selected wavelength and a constant power under a load condition by which the average length of the carbon fibers is reduced to about half of its initial value as shown in the Examples described later, the changing rate in the mean diameter of the granular parts is not more than 10%, preferably, not more than 5%, thus, the granular parts, i.e., the binding sites of fibers are maintained stably.

In carbon fibrous structures according to the present invention, it is preferable that the carbon fibrous structure has an area-based circle-equivalent mean diameter of 50-100 μm, and more preferably, 60-90 μm. The "area-based circle-equivalent mean diameter" used herein is the value which is determined by taking a picture for the outside shapes of the carbon fibrous structures with a suitable electron microscope, etc., tracing the contours of the respective carbon fibrous structures in the obtained picture using a suitable image analysis software, e.g., WinRoof™ (Mitani Corp.), and measuring the area within each individual contour, calculating the circle-equivalent mean diameter of each individual carbon fibrous structure, and then, averaging the calculated data.

Although it is not to be applied in all cases because the circle-equivalent mean diameter may be affected by the kind of the other material, e.g. a resin, to be complexed, the circle-equivalent mean diameter may become a factor by which the maximum length of a carbon fibrous structure upon combining into the other material such as resin is determined. In view of easy mixing into the composite material, and good moldability for the obtained composite material, as well as attaining an ample electrical conductivity, In general, it is preferable that the circle-equivalent mean diameter is in the range of 50-100 μm.

As mentioned above, the carbon fibrous structure according to the present invention has the configuration where the fine carbon fibers existing in three dimensional network state are bound together by the granular part (s) so that the carbon fibers are externally elongated from the granular part(s). When two or more granular parts are present in a carbon fibrous structure, wherein each granular part binds the fibers so as to form the three dimensional network, the mean distance between adjacent granular parts may be, for example, 0.5-300 μm, preferably, 0.5-100 μm, and more preferably, 1-50 µm. The distance between adjacent granular parts used herein is determined by measuring distance from the center of a granular part to the center of another granular part which is adjacent the former granular part. When the mean distance between the granular parts is in the range of 0.5-300 µm, a configuration where the carbon fibers form an adequately developed three dimensional network is obtained. Therefore, when the carbon fiber structures are added and dispersed in the composite material, good electrically conductive paths can be contributed, and good dispersibility of the carbon fibrous structures in the composite material can be expected.

Furthermore, the carbon fibrous structure used in the present invention may exhibit a bulky, loose form in which the carbon fibers are sparsely dispersed, because the carbon fibrous structure is comprised of carbon fibers that are configured as a three dimensional network and are bound together by a granular part so that the carbon fibers are externally elongated from the granular part as mentioned above. It is desirable that the bulk density thereof is in the range of 0.0001-0.05 g/cm$^3$, more preferably, 0.001-0.02 g/cm$^3$.

Furthermore, the carbon fibrous structure according to the present invention can enjoy good electric properties in itself, since the carbon fibers in the structure are bound together by a granular part produced in the growth process of the carbon fibers as mentioned above. For instance, it is desirable that the carbon fibrous structure has a powder electric resistance determined under a certain pressed density, 0.8 g/cm$^3$, of not more than 0.02Ω·cm, more preferably, 0.001 to 0.010Ω·cm. When the particle's resistance is not more than 0.02Ω·cm, it is possible to form good electrically conductive paths.

In order to enhance the strength and electric conductivity of the carbon fibrous structure used in the present invention, it is desirable that the graphene sheets that make up the carbon fibers have a small number of defects, and more specifically, for example, the $I_D/I_C$ ratio of the carbon fiber determined by Raman spectroscopy (measured using 514 nm of argon laser) is not more than 0.2, more preferably, not more than 0.1. Incidentally, in Raman spectroscopic analysis, with respect to a large single crystal graphite, only the peak (G band) at 1580 cm$^{-1}$ appears. When the crystals are of finite ultrafine sizes or have any lattice defects, the peak (D band) at 1360 cm$^{-1}$ can appear. Therefore, when the intensity ratio ($R=I_{1360}/I_{1580}=I_D/I_C$) of the D band and the G band is below the selected range as mentioned above, it is possible to say that there is little defect in graphene sheets.

Furthermore, it is desirable that the carbon fibrous structure according to the present invention has a combustion initiation temperature in air of not less than 750° C., preferably, 800° C.-900° C. Such a high thermal stability would be brought about by the above mentioned facts that it has little defects and that the carbon fibers have a predetermined outside diameter.

A carbon fibrous structure having the above described, desirable configuration may be prepared as follows, although it is not limited thereto.

Basically, an organic compound such as a hydrocarbon is chemical thermally decomposed through the CVD process in the presence of ultrafine particles of a transition metal as a catalyst in order to obtain a fibrous structure, and then the fibrous structure thus obtained undergoes a high temperature heating treatment.

As a raw material organic compound, hydrocarbons such as benzene, toluene, xylene; carbon monoxide (CO); and alcohols such as ethanol may be used. It is preferable, but not limited, to use as carbon sources at least two carbon compounds which have different decomposition temperatures. Incidentally, the words "at least two carbon compounds" used herein not only include two or more kinds of raw materials, but also include one kind of raw material that can undergo a reaction, such as hydrodealkylation of toluene or xylene, during the course of synthesis of the fibrous structure such that in the subsequent thermal decomposition procedure it can function as at least two kinds of carbon compounds having different decomposition temperatures.

When as the carbon sources at least two kinds of carbon compounds are provided in the thermal decomposition reaction system, the decomposition temperatures of individual carbon compounds may be varied not only by the kinds of the carbon compounds, but also by the gas partial pressures of individual carbon compounds, or molar ratio between the compounds. Therefore, as the carbon compounds, a relatively large number of combinations can be used by adjusting the composition ratio of two or more carbon compounds in the raw gas.

For example, the carbon fibrous structure according to the present invention can be prepared by using two or more carbon compounds in combination, while adjusting the gas partial pressures of the carbon compounds so that each compound performs mutually different decomposition temperature within a selected thermal decomposition reaction temperature range, and/or adjusting the residence time for the carbon compounds in the selected temperature region, wherein the carbon compounds to be selected are selected from the group consisting of alkanes or cycloalkanes such as methane, ethane, propanes, butanes, pentanes, hexanes, cyclopropane, cycrohexane, particularly, alkanes having 1-7 carbon atoms; alkenes or cycloolefin such as ethylene, propylene, butylenes, pentenes, heptenes, cyclopentene, particularly, alkenes having 1-7 carbon atoms; alkynes such as acetylene, propyne, particularly, alkynes having 1-7 carbon atoms; aromatic or heteroaromatic hydrorocarbons such as benzene, toluene, styrene, xylene, naphthalene, methyl naphtalene, indene, phenanthrene, particularly, aromatic or heteroaromatic hydrorocarbons having 6-18 carbon atoms; alcohols such as methanol, ethanol, particularly, alcohols having 1-7 carbon atoms; and other carbon compounds involving such as carbon monoxide, ketones, ethers. Further, to optimize the mixing ratio can contribute to the efficiency of the preparation.

When a combination of methane and benzene is utilized among such combinations of two or more carbon compounds, it is desirable that the molar ratio of methane/benzene is 1-600, preferably, 1.1-200, and more preferably 3-100. The ratio is for the gas composition ratio at the inlet of the reaction furnace. For instance, when as one of carbon sources toluene is used, in consideration of the matter that 100% of the toluene decomposes into methane and benzene in proportions of 1:1 in the reaction furnace, only a deficiency of methane may be supplied separately. For example, in the case of adjusting the methane/benzene molar ratio to 3, 2 mol methane may be added to 1 mol toluene. As the methane to be added to the toluene, it is possible to use the methane which is contained as an unreacted form in the exhaust gas discharged from the reaction furnace, as well as a fresh methane specially supplied.

Using the composition ratio within such a range, it is possible to obtain the carbon fibrous structure in which both the carbon fiber parts and granular parts are efficiently developed.

Inert gases such as argon, helium, xenon; and hydrogen may be used as an atmosphere gas.

As catalyst, a mixture of transition metal such as iron, cobalt, molybdenum, or transition metal compounds such as ferrocene, metal acetate; and sulfur or a sulfur compound such as thiophene, ferric sulfide; may be used.

The first intermediate described later may be synthesized using a CVD process with hydrocarbon or etc., which has been conventionally used in the art. The steps may comprise gasifying a mixture of hydrocarbon and a catalyst as a raw material, supplying the gasified mixture into a reaction furnace along with a carrier gas such as hydrogen gas, etc., and undergoing thermal decomposition at a temperature in the range of 800° C.-1300° C. By following such synthesis procedures, the product obtained is an aggregate, which is of several to several tens of centimeters in size and which is composed of plural carbon fibrous structures (intermediates), each of which has a three dimensional configuration where fibers having 15-100 nm in outside diameter are bound together by a granular part that has grown around the catalyst particle as the nucleus.

The thermal decomposition reaction of the hydrocarbon raw material mainly occurs on the surface of the catalyst particles or on growing surface of granular parts that have grown around the catalyst particles as the nucleus, and the fibrous growth of carbon may be achieved when the recrystallization of the carbons generated by the decomposition progresses in a constant direction. When obtaining carbon fibrous structures according to the present invention, however, the balance between the thermal decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the granular part as a centre, rather than in one dimensional direction. The three dimensional growth of the carbon fibers depends not only on the balance between the thermal decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, when the growing rate is faster than the decomposition rate, the carbon material tends to grow into fibers, whereas when the thermal decomposition rate is faster than the growing rate, the carbon material tends to grow in peripheral directions of the catalyst particle. Accordingly, by changing the balance between the thermal decomposition rate and the growing rate intentionally, it is possible to control the growth of carbon material to occur in multi-direction rather than in single direction, and to produce three dimensional structures according to the present invention.

In order to form the above mentioned three-dimensional configuration in the intermediate produced, where the fibers are bound together by a granular part, with ease, it is desirable to optimize the compositions such as the catalyst used, the residence time in the reaction furnace, the reaction temperature and the gas temperature.

With respect to the method for preparing the carbon fibrous structure according to the present invention with efficiency, as another approach to the aforementioned one that two or more carbon compounds which have mutually different decomposition temperature are used in an appropriate mixing ratio, there is an approach that the raw material gas supplied into the reaction furnace from a supply port is forced to form a turbulent flow in proximity to the supply port. The "turbulent flow" used herein means a furiously irregular flow, such as flow with vortexes.

In the reaction furnace, immediately after the raw material gas is supplied into the reaction furnace from the supply port, metal catalyst fine particles are produced by the decomposition of the transition metal compound as the catalyst involved in the raw material gas. The production of the fine particles is carried out through the following steps. Namely, at first, the transition metal compound is decomposed to make metal atoms, then, plural number of for example, about one hundred of metal atoms come into collisions with each other to create a cluster. At the created cluster state, it can not function as a catalyst for the fine carbon fiber. Then, the clusters further are aggregated by collisions with each other to grow into a metal crystalline particle of about 3-10 nm in size, and which particle comes into use as the metal catalyst fine particle for producing the fine carbon fiber.

During the catalyst formation process as mentioned above, if the vortex flows belonging to the furiously turbulent flow are present, it is possible that the collisions of carbon atoms or collisions of clusters become more vigorously as compared with the collisions only due to the Brownian movement of atoms or collisions, and thus the collision frequency per unit time is enhanced so that the metal catalyst fine particles are produced within a shorter time and with higher efficiency. Further, since concentration, temperature, and etc. are homogenized by the force of vortex flow, the obtained metal catalyst fine particles become uniform in size. Additionally, during the process of producing metal catalyst fine particles, a metal catalyst particles' aggregate in which numerous metal crystalline particles was aggregated by vigorous collisions with the force of vortex flows can be also formed. Since the metal catalyst particles are rapidly produced as mentioned above, the decomposition of carbon compound can be accelerated so that an ample amount of carbonaceous material can be provided. Whereby, the fine carbon fibers grow up in a radial pattern by taking individual metal catalyst particles in the aggregate as nuclei. When the thermal decomposition rate of a part of carbon compounds is faster than the growing rate of the carbon material as previously described, the carbon material may also grow in the circumferential direction so as to form the granular part around the aggregate, and thus the carbon fiber structure of the desired three dimensional configuration may be obtained with efficiency.

Incidentally, it may be also considered that there is a possibility that some of the metal catalyst fine particles in the aggregate are ones that have a lower activity than the other particles or ones that are deactivated on the reaction. If nonfibrous or very short fibrous carbon material layers grown by such catalyst fine particles before or after the catalyst fine particles aggregate are present at the circumferential area of the aggregate, the granular part of the carbon fiber structure according to the present invention may be formed.

The concrete means for creating the turbulence to the raw material gas flow near the supply port for the raw material gas is not particularly limited. For example, it is adaptable to provide some type of collision member at a position where the raw material gas flow introduced from the supply port can be interfered by the collision section. The shape of the collision section is not particularly limited, as far as an adequate turbulent flow can be formed in the reaction furnace by the vortex flow which is created at the collision section as the starting point. For example, embodiments where various shapes of baffles, paddles, tapered tubes, umbrella shaped elements, and etc., are used singly or in varying combinations and located at one or more positions may be adaptable.

The first intermediate, obtained by heating the mixture of the catalyst and hydrocarbon at a constant temperature in the range of 800° C.-1300° C., has a structure that resembles sheets of carbon atoms laminated together, (and being still in half-raw, or incomplete condition). When analyzed with Raman spectroscopy, the D band of the intermediate is very large and many defects are observed. Further, the obtained intermediate is associated with unreacted raw materials, non-fibrous carbon, tar moiety, and catalyst metal.

Therefore, the intermediate is subjected to a high temperature heat treatment using a proper method at a temperature of 2400-3000° C. in order to remove such residues from the intermediate and to produce the intended carbon fibrous structure with few defects.

For instance, the intermediate may be heated at 800-1200° C. to remove the unreacted raw material and volatile flux such as the tar moiety, and thereafter annealed at a high temperature of 2400-3000° C. to produce the intended structure and, concurrently, to vaporize the catalyst metal, which is included in the fibers, to remove it from the fibers. In this process, it is possible to add a small amount of a reducing gas and carbon monoxide into the inert gas atmosphere to protect the carbon structures.

By annealing the intermediate at a temperature of 2400-3000° C., the patch-like sheets of carbon atoms are rearranged to associate mutually and then form multiple graphene sheet-like layers.

After or before such a high temperature heat treatment, the aggregates may be subjected to crushing in order to obtain carbon fibrous structures, each having an area-based circle-equivalent mean diameter of several centimeters. Then, the obtained carbon fibrous structures may be subjected to pulverization in order to obtain the carbon fibrous structures having an area-based circle-equivalent mean diameter of 50-100 μm. It is also possible to perform the pulverization directly without crushing. On the other hand, the initial aggregates involving plural carbon fibrous structures according to the present invention may also be granulated for adjusting shape, size, or bulk density to one's suitable for using a particular application. More preferably, in order to utilize effectively the above structure formed from the reaction, the annealing would be performed in a state such that the bulk density is low (the state that the fibers are extended as much as they can and the voidage is sufficiently large). Such a state may contribute to improved electric conductivity of a resin matrix.

The carbon fibrous structures used in the present invention may have the following properties:

A) a low bulk density;
B) a good dispersibility in a matrix such as resin;
C) a high electrical conductivity;
D) a high heat conductivity;
E) a good slidability;
F) a good chemical stability;
G) a high thermal stability; and etc.

Thus, it can be used as the filler of composite material according to the present invention against the solid material mentioned later, such as resins, ceramics, metals, etc., in a wide range of applications.

Next, as the other material, which distributes carbon fibrous structures as mentioned above in a composite, material according to the present invention, organic polymer, inorganic material, metal and so on can all be used, but organic polymers are preferred.

For example, organic polymers may include various thermoplastic resins such as polypropylene, polyethylene, polystyrene, polyvinyl chloride, polyacetal, polyethylene terephthalate, polycarbonate, polyvinyl acetate, polyamide, polyamide imide, polyether imide, polyether ether ketone, polyvinyl alcohol, poly phenylene ether, poly(meth)acrylate, and liquid crystal polymer; and various thermosetting resins such as epoxy resin, vinyl ester resin, phenol resin, unsaturated polyester resin, furan resins, imide resin, urethane resin, melamine resin, silicone resin and urea resin; as well as various elastomers such as natural rubber, styrene butadiene rubber (SBR), butadiene rubber (BR), polyisoprene rubber (IR), ethylene-propylene rubber (EPDM), nitrile rubber (NBR), polychloroprene rubber (CR), isobutylene isoprene rubber (IIR), polyurethane rubber, silicone rubber, fluorine rubber, acrylic rubber (ACM), epichlorohydrin rubber, ethylene acrylic rubber, norbornene rubber and thermoplastic elastomer.

Furthermore, the organic polymers may be in various forms of composition, such as adhesive, fibers, paint, ink, and etc.

That is, for example, the other material may be an adhesive agent such as epoxy type adhesive, acrylic type adhesive, urethane type adhesive, phenol type adhesive, polyester type adhesive, polyvinyl chloride type adhesive, urea type adhesive, melamine type adhesive, olefin type adhesive, acetic acid vinyl type adhesive, hotmelt type adhesive, cyano acrylate type adhesive, rubber type adhesive, cellulose type adhesive, etc.; fibers such as acrylic fibers, acetate fibers, aramid fiber, nylon fibers, novoloid fibers, cellulose fibers, viscose rayon fibers, vinylidene fibers, vinylon fibers, fluorine fibers, polyacetal fibers, polyurethane fibers, polyester fibers, polyethylene fibers, polyvinyl chloride fibers, polypropylene fibers, etc.; or a paint such as phenol resin type, alkyd type, epoxy type, acrylic resin type, unsaturated polyester type, polyurethane type, silicon type, fluorine resin type, synthetic resin emulsion type, etc.

Inorganic materials include ceramic materials and inorganic oxide polymers. Preferred concrete examples may include carbon materials such as carbon-carbon composite, glass, glass fiber, flat glass and other forming glass, silicate ceramics and other heat resisting ceramics, e.g. aluminum oxide, silicon carbide, magnesium oxide, silicone nitride and boron nitride.

In the case that the other material is metal, aluminum, magnesium, lead, copper, tungsten, titanium, niobium, hafnium, vanadium, alloys, and mixtures thereof, are exemplified as preferable metals.

In the present invention, as the procedure for complexing the carbon fibrous structure with the other material, procedures where the carbon fibrous structure are mixed or kneaded with the other material may be adaptable. Alternatively, preform molding procedure is adaptable. The preform molding procedure is the procedure as exemplified below.

First, the carbon fibrous structures described above and an organic binder are mixed and kneaded using an appropriate machine such as double-arm kneader or mixer type kneader. As the binder, for instance, thermosetting resins, pitches, etc., are enumerated. Although the thermosetting resins involve ones which are in the liquid state at the ordinary temperatures, and others which are in the solid state at the ordinary temperatures but can change into the liquid state on heating to about 50-90° C., any of them is usable as far as it can be cross-linked or polymerized, and thus come into a hardened macromolecule by subjecting to a curing step of heating at about 100-200° C., and once it is hardened it can not acquire liquidity even when it is exposed to a higher temperature but it is decomposed and carbonized. As the pitch, there are various types involving, for instance, isotropic pitch, mesophase pitch, etc., and any of them is usable.

Incidentally, in the case of using thermosetting resin which is the type of using a solvent upon kneading, the solvent should be dried at a temperature of not effecting cure on the thermosetting resin, after kneading.

Then, when the kneaded mixture of the carbon fibrous structures and the thermosetting resin forms lumps, the lumps undergo crushing in order to bring the mixture to the next molding step.

In the molding step, the method of pressing the mixture vertically with molding dies, the isotropic press molding of utilizing hydrostatic pressure with a rubber die, etc., are preferably usable.

It is preferable that the molding pressure at the press molding is in the range of about 1-2000 kg/cm$^3$. Incidentally, on this molding, the carbon fibrous structures come to be mutually adhered with the thermosetting resin. On this occasion, if the thermosetting resin is still in uncured state, the adhering force is weak, and thus the adhered carbon fibrous structures get back to separated ones by the restoring force of the carbon fibrous structures after releasing pressure. Therefore, it is preferable to cure the thermosetting resin by heating to about 100-200° C. on the press so as to enhance the adhering force.

Next, the thermosetting resin is carbonized by heating the molded article which was prepared by curing the thermosetting resin under oxygen-free atmosphere or inherent gas atmosphere. The thermosetting resin is decomposed and carbonized in a temperature range of 300-900° C. Further, by annealing at a higher temperature, the patch-like sheets which constitute the carbon fibrous structures are rearranged to associate mutually and then form multiple graphene sheet-like layers. Incidentally, on this annealing procedure, the portions made of the carbonized thermosetting resin are similarly modified so as to be graphitized.

In the case of using the pitch as binder, the molded article undergoes infusing treatment at 150-400° C. under oxidizing atmosphere after the press molding, and then, it undergoes carbonizing treatment at 800-1500° C.

In either case of using thermosetting resin or pitch, it is preferable to applying pressure to the molded article until the binder comes to be hardened or becomes infusible in order to prevent the mutual detachments of the carbon fibrous structures at the adhered sites by the restoring force of the carbon fibrous structures. Further, it is more preferable to applying pressure to the molded article even upon the carbonizing step and graphitizing step where the binder is carbonized and the carbons derived from the carbon fibrous structures and the binder are graphitized. When applying the heat treatment at a temperature of not less than 1800° C., the carbon fibrous structures can undergo the heat treatment while they are in a confined state, and thus, it is possible to immobilize the configuration of the carbon fibrous structures in the molded article by annealing.

Thus, a framework structure in which the carbonization and graphitization experienced carbon fibrous structures are bonded mutually with carbons is obtained. Then, an immersing step in which resin, rubber, metal, or carbonaceous type material are introduced into the porous parts formed in the framework structure is carried out.

As the resin to which the framework structure is immersed at the immersing step, for instance, various thermoplastic resins such as polypropylene, polyethylene, polystyrene, polyvinyl chloride, polyacetal, polyethylene terephthalate, polycarbonate, polyvinyl acetate, polyamide, polyamide imide, polyether imide, polyether ether ketone, polyvinyl alcohol, poly phenylene ether, poly(meth)acrylate, and liquid crystal polymer; and various thermosetting resins such as epoxy resin, vinyl ester resin, phenol resin, unsaturated polyester resin, furan resins, imide resin, urethane resin, melamine resin, silicone resin and urea resin can be enumerated. As the rubber to be used for the immersion, for instance, natural rubber, styrene butadiene rubber (SBR), butadiene rubber (BR), polyisoprene rubber (IR), ethylene-propylene rubber (EPDM), nitrile rubber (NBR), polychloroprene rubber (CR), isobutylene isoprene rubber (IIR), polyurethane rubber, silicone rubber, fluorine rubber, acrylic rubber (ACM), epichlorohydrin rubber, ethylene acrylic rubber, and norbornene rubber can be enumerated. As the metal to be used for the immersion, for instance, aluminum, magnesium, lead, copper, tungsten, titanium, niobium, hafnium, vanadium, and alloys and mixtures thereof can be enumerated. Further, as the carbonaceous type material to be used for the immersion, for instance, glassy carbon can be enumerated.

As the immersing method, either the pressurizing procedure or the sucking procedure is applicable. When using an immersing instrument of the pressurizing scheme, the framework structure and an immersion material as mentioned above are set in compression molding dies composed of a male die and a female die, and then, by applying pressure, the immersion material is allowed to penetrate into the porous parts formed in the framework structure. The compression molding dies may be heated with an appropriate heater. In the case that the immersion material used is a resin monomer which can be hardened with a curing agent, heating by the heater is not necessitated. This pressurizing procedure is applicable to all types of above mentioned immersion material.

On the other hand, when using an immersing instrument of the sucking scheme, it is effective in applying the resin monomer which can be hardened with a curing agent or the like, although it is not applicable to the metal or the carbonaceous type material.

Moreover, in a composite material according to the present invention, it is possible to include other filling agents in addition to the above mentioned carbon fibrous structures. Such filling agents may include metallic minute particles, silica, calcium carbonate, magnesium carbonate, carbon black, glass fibers, and carbon fibers. These filling agents may be used singly or in any combination of more than two agents.

A composite material, according to the present invention includes the aforementioned carbon fibrous structures in an large amount as mentioned above, and thus, with making use of its superior mechanical strength such as hardness, excellent electrical conductivity, excellent thermal conductivity, etc., it can be preferably used for structural material that can substitute for steel bar or steel frame, or electrode material, etc., although the use of the composite material of the present invention is not limited to these mentioned instances.

EXAMPLES

Hereinafter, this invention will be illustrated in detail with practical examples. However, it is to be understood that the invention is not limited thereto.

The respective physical properties illustrated later are measured by the following protocols.

<Area Based Circle-Equivalent Mean Diameter>

First, a photograph of pulverized product was taken with SEM. On the taken SEM photo, only carbon fibrous structures with a clear contour were taken as objects to be measured, and broken ones with unclear contours were omitted. Using all carbon fibrous structures that can be taken as objects in one single field of view (approximately, 60-80 pieces), about 200 pieces in total were measured with three fields of views. Contours of the individual carbon fibrous structures were traced using the image analysis software, WinRoof™ (trade name, marketed by Mitani Corp.), and area within each individual contour was measured, circle-equivalent mean diameter of each individual carbon fibrous structure was calculated, and then, the calculated data were averaged to determine the area based circle-equivalent mean diameter.

<Measurement of Bulk Density>

1 g of powder was placed into a 70 mm caliber transparent cylinder equipped with a distribution plate, then air supply at 0.1 Mpa of pressure, and 1.3 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and the average of the 6 points was calculated in order to determine the bulk density.

<Raman Spectroscopic Analysis>

The Raman spectroscopic analysis was performed with LabRam 800 manufactured by HORIBA JOBIN YVON, S.A.S., using 514 nm argon laser.

<Combustion Temperature>

Combustion behavior was determined using TG-DTA manufactured by MAC SCIENCE CO. LTD., at air flow rate of 0.1 liter/minute and heating rate of 10° C./minute. When burning, TG indicates a quantity reduction and DTA indicates an exothermic peak. Thus, the top position of the exothermic peak was defined as the combustion initiation temperature.

<X Ray Diffraction>

Using the powder X ray diffraction equipment (JDX3532, manufactured by JEOL Ltd.), carbon fiber structures after annealing processing were determined. K$\alpha$ ray which was generated with Cu tube at 40 kV, 30 NV was used, and the measurement of the spacing was performed in accordance with the method defined by The Japan Society for the Promotion of Science (JSPS), described in "Latest Experimental Technique For Carbon Materials (Analysis Part)", Edited by Carbon Society of Japan), and as the internal standard silicon powder, was used.

<Particle's Resistance and Decompressibility>

1 g of CNT powder was scaled, and then press-loaded into a resinous die (inner dimensions: L 40 mm, W 10 nun, H 80 vim), and the displacement and load were read out. A constant current was applied to the powder by the four-terminal method, and in this condition the voltage was measured. After measuring the voltage until the density came to 0.9 g/cm$^3$, the applied pressure was released and the density after decompression was measured. Measurements taken when the powder was compressed to 0.5, 0.8 or 0.9 g/cm$^3$ were adopted as the particle's resistance.

<Mean Diameter and Roundness of the Granular Part, and Ratio of the Granular Part to the Fine Carbon Fiber>

First, a photograph of the carbon fibrous structures was taken with SEM in an analogous fashion as in the measurement of area based circle-equivalent mean diameter. On the taken SEM photo, only carbon fibrous structures with a clear contour were taken as objects to be measured, and broken ones with unclear contours were omitted. Using all carbon fibrous structures that can be taken as objects in one single field of view (approximately, 60-80 pieces), about 200 pieces in total were measured with three fields of views.

On the carbon fibrous structures to be measured, assuming each individual granular part which is the binding point of carbon fibers to be a particle, contours of the individual granular parts were traced using the image analysis software, WinRoof™ (trade name, marketed by Mitani Corp.), and area within each individual contour was measured, circle-equivalent mean diameter of each individual granular part was calculated, and then, the calculated data were averaged to determine the area based circle-equivalent mean diameter.

Roundness (R) is determined by inputting value of the area (A) within each individual contour computed by the above and a measured value of each individual contour's length (L) to the following equation to calculate the roundness of each individual granular part, and then, averaging the calculated data.

$$R=A*4\pi/L^2 \quad \text{[Numerical Formula 1]}$$

Further, the outer diameter of the fine carbon fibers in the individual carbon fibrous structures to be measured are determined, and then, from the outer diameter determined and the circle-equivalent mean diameter of the granular part calculated as above, the ratio of circle-equivalent mean diameter to the outer diameter of the fine carbon fiber is calculated for each individual carbon fibrous structure; and then the data obtained are averaged.

<Mean Distance Between Granular Parts>

First, a photograph of the carbon fibrous structures was taken with SEM in an analogous fashion as in the measurement of area based circle-equivalent mean diameter. On the taken SEM photo, only carbon fibrous structures with a clear contour were taken as objects to be measured, and broken ones with unclear contours were omitted. Using all carbon fibrous structures that can be taken as objects in one single field of view (approximately, 60-80 pieces), about 200 pieces in total were measured with three fields of views.

On the carbon fibrous structures to be measured, all places where the granular parts are mutually linked with a fine carbon fiber are found out. Then, at the respective places, the distance between the adjacent granular parts which are mutually linked with the fine carbon fiber (the length of the fine carbon fiber including the center of a granular part at one end to the center of another granular part at another end) is measured, and then the data obtained are averaged.

<Destruction Test for Carbon Fibrous Structure>

To 100 ml of toluene in a lidded vial, the carbon fiber structure is added at a ratio of 30 μg/ml in order to prepare the dispersion liquid sample of the carbon fibrous structure.

To the dispersion liquid sample of the carbon fibrous structure thus prepared, ultrasound is applied using a ultrasonic cleaner (manufactured by SND Co., Ltd., Trade Name: USK-3) of which generated frequency is 38 kHz and power is 150 w, and the change of the carbon fibrous structure in the dispersion liquid is observed in the course of time aging.

First, 30 minutes after the application of ultrasound is stated, a 2 ml constant volume aliquot of the dispersion sample is pipetted, and the photo of the carbon fibrous structures in the aliquot is taken with SEM. On the obtained SEM photo, 200 pieces of fine carbon fibers in the carbon fibrous structures (fine carbon fibers at least one end of which is linked to the granular part) are selected randomly, then the length of the each individual selected fine carbon fibers is measured, and mean length $D_{50}$ is calculated. The mean length calculated is taken as the initial average fiber length.

Meanwhile, on the obtained SEM photo, 200 pieces of granular parts which each are the binding point of carbon fibers in the carbon fibrous structures are selected randomly. Assuming each individual selected granular part to be a particle, contours of the individual granular parts were traced using the image analysis software, WinRoof™ (trade name, marketed by Mitani Corp.), and area within each individual contour was measured, circle-equivalent mean diameter of each individual granular part was calculated, and then, $D_{50}$ mean value thereof is calculated. The $D_{50}$ mean value calculated is taken as the initial average diameter of the granular parts.

Thereafter, according to the same procedure, a 2 ml constant volume aliquot of the dispersion sample is pipetted every constant periods, and the photo of the carbon fibrous structures in the each individual aliquot is taken with SEM, and the mean length $D_{50}$ of the fine carbon fibers in the carbon fibrous structure and the mean diameter $D_{50}$ of the granular part in the carbon fibrous structure are calculated individually.

At the time when the mean length $D_{50}$ of the fine carbon fibers comes to be about half the initial average fiber length (in the following Examples, 500 minutes after the application of ultrasound is stated.), the mean diameter $D_{50}$ of the granular part is compared with the initial average diameter of the granular parts in order to obtain the rate of variability (%) thereof.

<Electrical Conductivity>

Using a 4-pin probe type low resistivity meter (LORESTA-GP, manufactured by Mitsubishi Chemical), the resistance (Ω) at nine points of a coated film surface was measured. Then, the measured values are converted into volume resistivity (Ω·cm) by the resistivity meter, and an average was calculated.

<Transverse Rupture Strength>

A test piece was cut up into 10 mm wide strips, and then transverse rupture strength (kg/mm²) of the resultant strips was determined by a tension test machine.

<Thermal Conductivity>

A test piece was cut out into a proper shape, and then analyzed by the laser flash method for its thermal conductivity (W/m·K).

Synthetic Example 1

By the CVD process, carbon fibrous structures were synthesized using toluene as the raw material.

The synthesis was carried out in the presence of a mixture of ferrocene and thiophene as the catalyst, and under the reducing atmosphere of hydrogen gas. Toluene and the catalyst were heated to 380° C. along with the hydrogen gas, and then they were supplied to the generation furnace, and underwent thermal decomposition at 1250° C. in order to obtain the carbon fibrous structures (first intermediate).

Figure 8:
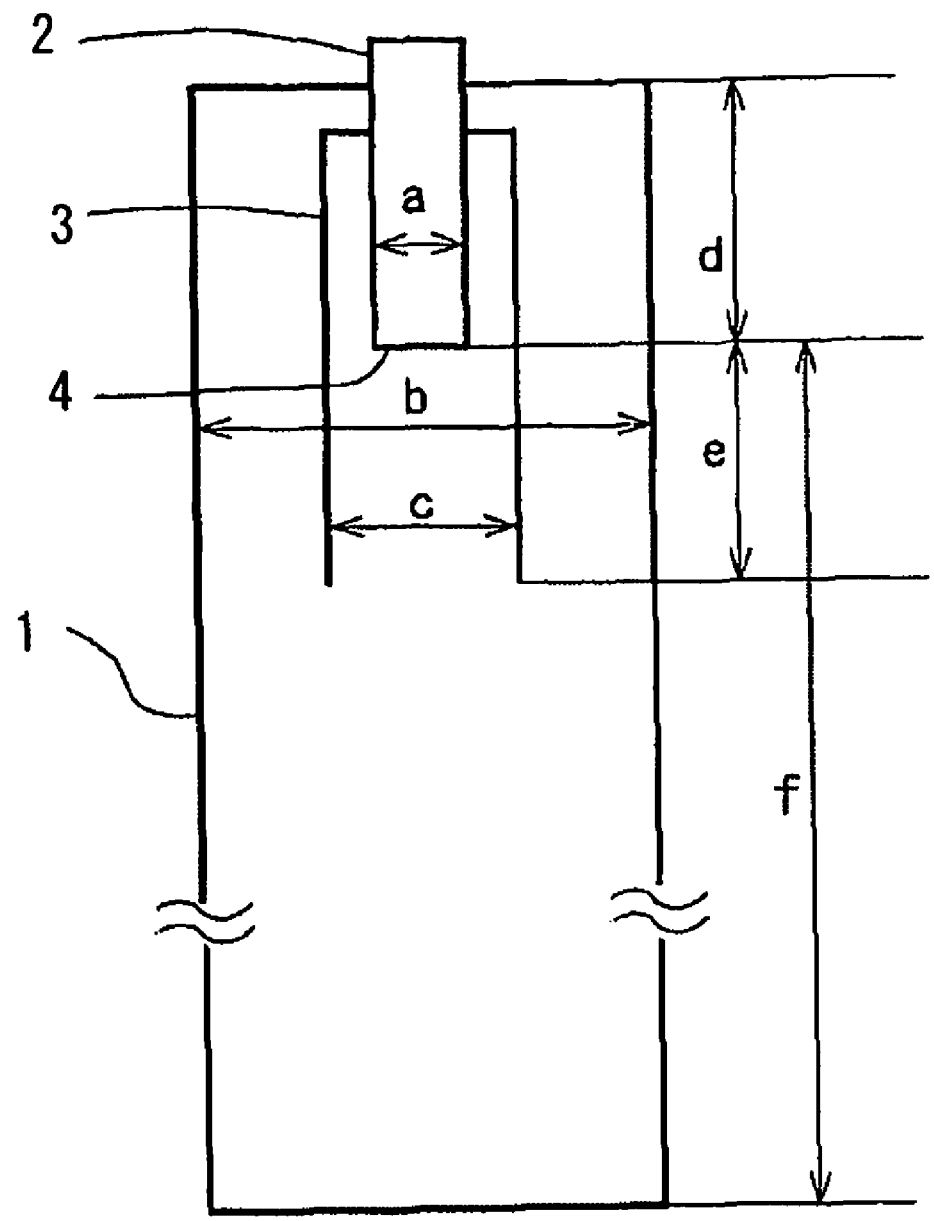
FIG. 8 is a schematic diagram illustrating a generation furnace used for manufacturing carbon fibrous structures in an Example of the present invention.

The generation furnace used for the carbon fibrous structures (first intermediate) is illustrated schematically in FIG. 8. As shown in FIG. 8, the generation furnace 1 was equipped at the upper part thereof with a inlet nozzle 2 for introducing the raw material mixture gas comprising toluene, catalyst and hydrogen gas as aforementioned into the generation furnace 1. Further, at the outside of the inlet nozzle 2, a cylindrical-shaped collision member 3 was provided. The collision member 3 was set to be able to interfere in the raw material gas flow introduced from the raw material supply port 4 located at the lower end of the inlet nozzle 2. In the generation furnace 1 used in this Example, given that the inner diameter of the inlet nozzle 2, the inner diameter of the generation furnace 1, the inner diameter of the cylindrical-shaped collision member 3, the distance from the upper end of the generation furnace 1 to the raw material mixture gas supply port 4, the distance from the raw material mixture gas supply port 4 to the lower end of the collision member 3, and the distance from the raw material mixture gas supply port 4 to the lower end of the generation furnace 1 were "a", "b", "c", "d", "e", and "f", respectively, the ratio among the above dimensions was set as a:b:c:d:e:f—1.0:3.6:1.8:3.2:2.0:21.0. The raw material gas supplying rate to the generation furnace was 1850, and the pressure was 1.03 atms.

Sample for electron microscopes was prepared by dispersing the first intermediate into toluene.

Figure 1:
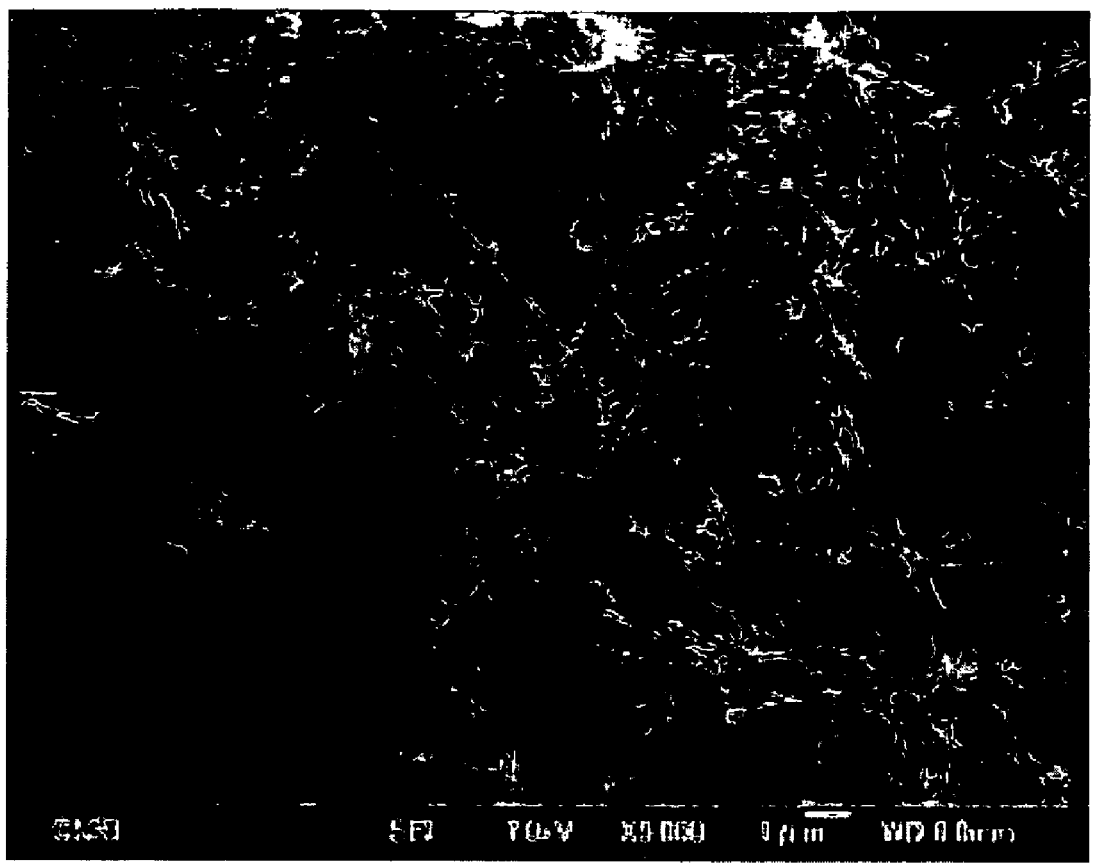
FIG. 1 is a SEM photo of a first intermediate for the carbon fibrous structure used for a composite material according to the present invention.

FIGS. 1 and 2 show SEM photo and TEM photo of the sample, respectively.

The synthesized first intermediate was baked at 900° C. in nitrogen gas in order to remove hydrocarbons such as tar and to obtain a second intermediate. The R value of the second intermediate measured by the Raman spectroscopic analysis was found to be 0.98.

Further, the second intermediate underwent a high temperature heat treatment at 2600° C. The obtained aggregates of the carbon fibrous structures underwent pulverization using an air flow pulverizer in order to produce the carbon fibrous structures to be used in the present invention.

A sample for electron microscopes was prepared by dispersing ultrasonically the obtained carbon fibrous structures into toluene. FIGS. 3, 4A and 4B show SEM photo and TEM photos of the sample, respectively.

Figure 5:
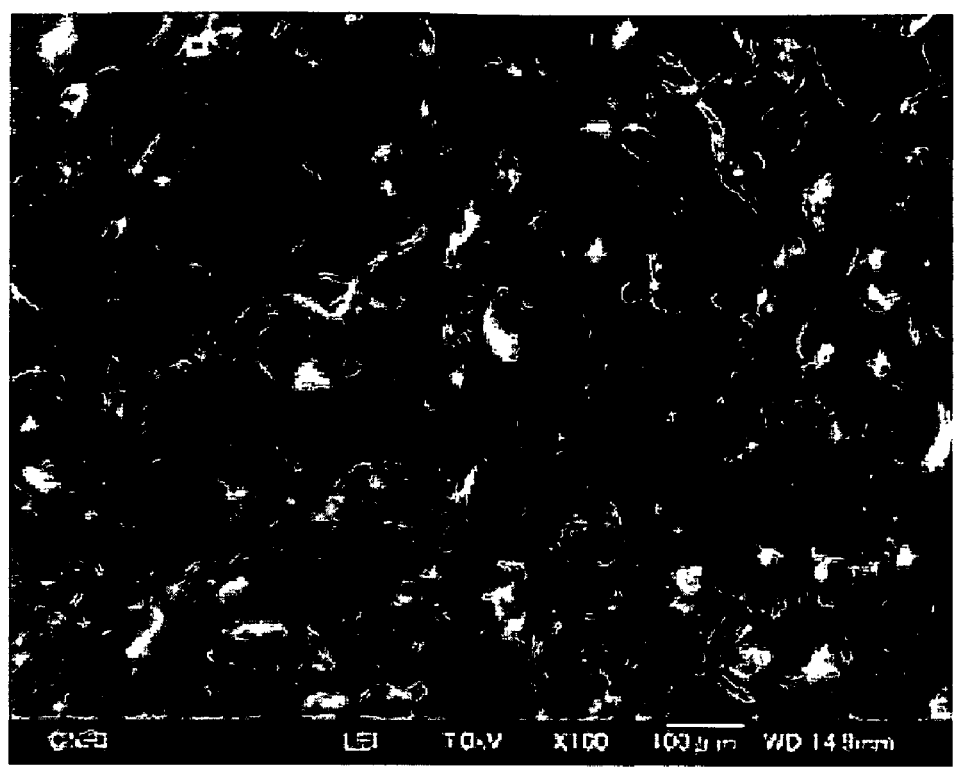
FIG. 5 is a SEM photo of a carbon fibrous structure used for a composite material according to the present invention.

FIG. 5 shows SEM photo of the obtained carbon fibrous structures as mounted on a sample holder for electron microscope, and Table 1 shows the particle distribution of obtained carbon fibrous structures.

Figure 6:
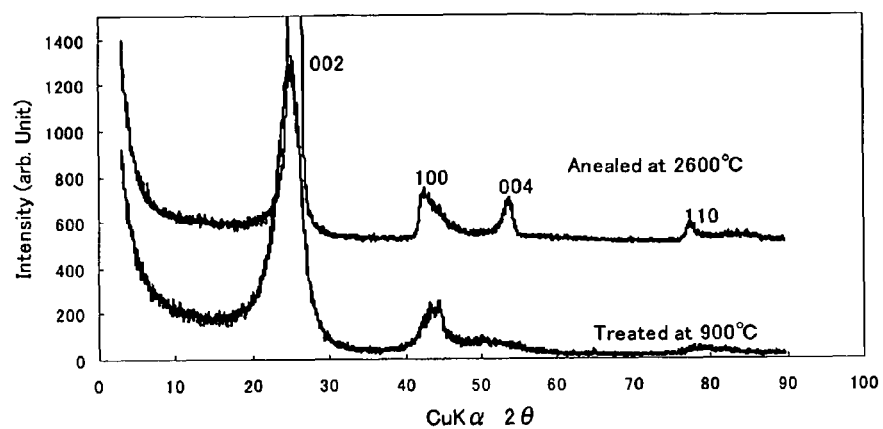
FIG. 6 is an X-ray diffraction chart of a carbon fibrous structure used for a composite material according to the present invention and of an intermediate thereof.
Figure 7:
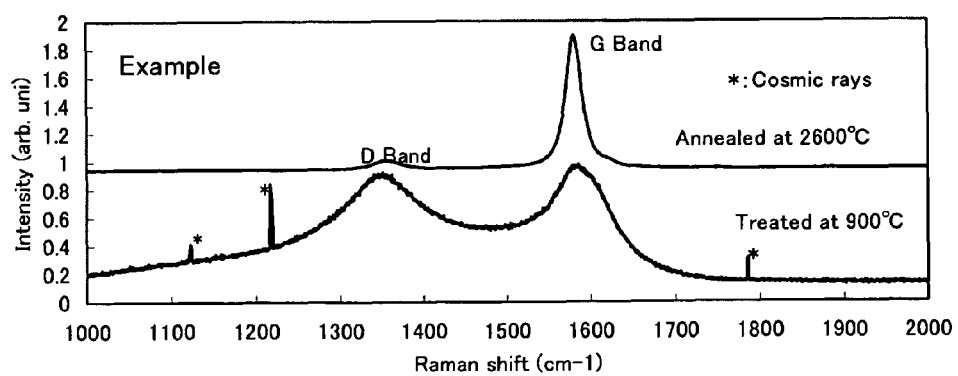
FIG. 7 is Raman spectra of a carbon fibrous structure used for a composite material according to the present invention and of an intermediate thereof.

Further, X-ray diffraction analysis and Raman spectroscopic analysis were performed on the carbon fibrous structure before and after the high temperature heat treatment in order to examine changes in these analyses. The results are shown in FIGS. 6 and 7, respectively.

Additionally, it was found that the carbon fibrous structures had an area based circle-equivalent mean diameter of 72.8 μm, bulk density of 0.0032 g/cm³, Raman $I_D/I_G$ ratio of 0.090, TG combustion temperature of 786° C., spacing of 3.383 Angstroms, powder electric resistance of 0.0083Ω·cm, and density after decompression of 0.25 g/cm³.

The mean diameter of the granular parts in the carbon fibrous structures was determined as 443 nm (SD 207 nm), that is 7.38 times larger than the outer diameter of the carbon fibers in the carbon fibrous structure. The mean roundness of the granular parts was 0.67 (SD 0.14).

Further, when the destruction test for carbon fibrous structure was performed according to the above mentioned procedure, the initial average fiber length ($D_{50}$) determined 30 minutes after the application of ultrasound was stated was found to be 12.8 μm, while the mean length $D_{50}$ determined 500 minutes after the application of ultrasound was stated was found to be 6.7 μm, which value was about half the initial value. This result showed that many breakages were given in the fine carbon fibers of the carbon fibrous structure. Whereas the variability (decreasing) rate for the diameter of granular part was only 4.8%, when the mean diameter ($D_{50}$) of the granular part determined 500 minutes after the application of ultrasound was stated was compared with the initial average diameter ($D_{50}$) of the granular parts determined 30 minutes after the application of ultrasound was stated. Considering measurement error, etc., it was found that the granular parts themselves were hardly destroyed even under the load condition that many breakages were given in the fine carbon, and the granular parts still function as the binding site for the fibers mutually.

Table 2 provides a summary of the various physical properties as determined in Synthetic Example 1.

TABLE 1

| Particle Distribution (pieces) | Synthetic Example 1 |
| --- | --- |
| <50 μm | 49 |
| 50 μm to <60 μm | 41 |
| 60 μm to <70 μm | 34 |
| 70 μm to <80 μm | 32 |
| 80 μm to <90 μm | 16 |
| 90 μm to <100 μm | 12 |

TABLE 1-continued

| Particle Distribution (pieces) | Synthetic Example 1 |
|---|---|
| 100 μm to <110 μm | 7 |
| ≧110 μm | 16 |
| Area based circle-equivalent mean diameter | 72.8 μm |

TABLE 2

| | Synthetic Example 1 |
|---|---|
| Area based circle-equivalent mean diameter | 72.8 μm |
| Bulk density | 0.0032 g/cm$^3$ |
| $I_D/I_G$ ratio | 0.090 |
| TG combustion temperature | 786° C. |
| Spacing for (002) faces | 3.383 Å |
| Particle's resistance at 0.5 g/cm$^3$ | 0.0173 Ω·cm |
| Particle's resistance at 0.8 g/cm$^3$ | 0.0096 Ω·cm |
| Particle's resistance at 0.9 g/cm$^3$ | 0.0083 Ω·cm |
| Density after decompression | 0.25 g/cm$^3$ |

Synthetic Example 2

By the CVD process, carbon fibrous structures were synthesized using a part of the exhaust gas from the generation furnace as a recycling gas in order to use as the carbon source the carbon compounds such as methane, etc., included in the recycling gas, as well as a fresh toluene.

The synthesis was carried out in the presence of a mixture of ferrocene and thiophene as the catalyst, and under the reducing atmosphere of hydrogen gas. Toluene and the catalyst as a fresh raw, material were heated to 380° C. along with the hydrogen gas in a preheat furnace, while a part of the exhaust gas taken out from the lower end of the generation furnace was used as a recycling gas. After it was adjusted to 380° C., it was mixed with the fresh raw material gas on the way of the supplying line for the fresh raw material to the generation furnace. The mixed gas was then supplied to the generation furnace.

The composition ratio in the recycling gas used were found to be $CH_4$ 7.5%, $C_6H_6$ 0.3%, $C_2H_2$ 0.7%, $C_2H_6$ 0.1%, CO 0.3%, $N_2$ 3.5%, and $H_2$ 87.6% by the volume based molar ratio. The mixing flow rate was adjusted so that the mixing molar ratio of methane and benzene in the raw material gas to be supplied to the generation furnace, $CH_4/C_6H_6$ was set to 3.44 (wherein, it was considered that the toluene in the fresh raw material gas had been decomposed at 100% to $CH_4$: $C_6H_6$—1:1 by the heating in the preheat furnace.

In the final raw material gas, $C_2H_2$, $C_2H_6$, and CO which were involved in the recycling gas to be mixed were naturally included. However, since these ingredients were very small amount, they may substantially be ignored as the carbon source.

Then they were underwent thermal decomposition at 1250° C. in order to obtain the carbon fibrous structures (first intermediate) in an analogous fashion as Example 1.

The constitution of the generation furnace used for the carbon fibrous structures (first intermediate) was the same as that illustrated in FIG. 8, except that the cylindrical-shaped collision member 3 was omitted. The raw material gas supplying rate to the generation furnace was 1850 NL/min., and the pressure was 1.03 atms as in the case of Example 1.

Sample for electron microscopes was prepared by dispersing the first intermediate into toluene. SEM photo and TEM photo obtained for the sample are in much the same with those of Example 1 shown in FIGS. 1 and 2, respectively.

The synthesized first intermediate was baked at 900° C. in nitrogen gas in order to remove hydrocarbons such as tar and to obtain a second intermediate. The R value of the second intermediate measured by the Raman spectroscopic analysis was found to be 0.83.

Further, the second intermediate underwent a high temperature heat treatment at 2600° C. The obtained aggregates of the carbon fibrous structures underwent pulverization using an air flow pulverizer in order to produce the carbon fibrous structures according to the present invention.

A sample for electron microscopes was prepared by dispersing ultrasonically the obtained carbon fibrous structures into toluene. SEM photo and TEM photo obtained for the sample are in much the same with those of Example 1 shown in FIGS. 3 and 4, respectively.

Separately, the obtained carbon fibrous structures were mounted on a sample holder for electron microscope, and observed for the particle distribution. The obtained results are shown in Table 3.

Further, X-ray diffraction analysis and Raman spectroscopic analysis were performed on the carbon fibrous structure before and after the high temperature heat treatment in order to examine changes in these analyses. The results are in much the same with those of Example 1 shown in FIGS. 6 and 1, respectively.

Additionally, it was found that the carbon fibrous structures had an area based circle-equivalent mean diameter of 75.8 μm, bulk density of 0.004 g/cm$^3$, Raman $I_D/I_G$ ratio of 0.086, TO combustion temperature of 807° C., spacing of 3.386 A, powder electric resistance of 0.0077Ω·cm, and density after decompression of 0.26 g/cm$^3$.

The mean diameter of the granular parts in the carbon fibrous structures was determined as 349.5 nm (SD 180.1 nm), that is 5.8 times larger than the outer diameter of the carbon fibers in the carbon fibrous structure. The mean roundness of the granular parts was 0.69 (SD 0.15).

Further, when the destruction test for carbon fibrous structure was performed according to the above mentioned procedure, the initial average fiber length ($D_{50}$) determined 30 minutes after the application of ultrasound was stated was found to be 12.4 μm, while the mean length $D_{50}$ determined 500 minutes after the application of ultrasound was stated was found to be 6.3 μm, which value was about half the initial value. This result showed that many breakages were given in the fine carbon fibers of the carbon fibrous structure. Whereas the variability (decreasing) rate for the diameter of granular part was only 4.2%, when the mean diameter ($D_{50}$) of the granular part determined 500 minutes after the application of ultrasound was stated was compared with the initial average diameter ($D_{50}$) of the granular parts determined 30 minutes after the application of ultrasound was stated. Considering measurement error, etc., it was found that the granular parts themselves were hardly destroyed even under the load condition that many breakages were given in the fine carbon, and the granular parts still function as the binding site for the fibers mutually.

Tables 3 and 4 provides a summary of the various physical properties as determined in Synthetic Example 2.

TABLE 3

| Particle Distribution (pieces) | Synthetic Example 2 |
|---|---|
| <50 μm | 48 |
| 50 μm to <60 μm | 39 |
| 60 μm to <70 μm | 33 |

TABLE 3-continued

| Particle Distribution (pieces) | Synthetic Example 2 |
|---|---|
| 70 μm to <80 μm | 30 |
| 80 μm to <90 μm | 12 |
| 90 μm to <100 μm | 15 |
| 100 μm to <110 μm | 3 |
| ≧110 μm | 18 |
| Area based circle-equivalent mean diameter | 75.8 μm |

TABLE 4

| | Synthetic Example 2 |
|---|---|
| Area based circle-equivalent mean diameter | 75.8 μm |
| Bulk density | 0.004 g/cm$^3$ |
| $I_D/I_C$ ratio | 0.086 |
| TG combustion temperature | 807° C. |
| Spacing for (002) faces | 3.386 Å |
| Particle's resistance at 0.5 g/cm$^3$ | 0.0161 Ω·cm |
| Particle's resistance at 0.8 g/cm$^3$ | 0.0089 Ω·cm |
| Particle's resistance at 0.9 g/cm$^3$ | 0.0077 Ω·cm |
| Density after decompression | 0.26 g/cm$^3$ |

Examples 1-6

Resin pellets were prepared according to the formulations shown in Table 6, by blending the carbon fibrous structures obtained in Synthetic Example 1 with a polycarbonate resin (Panlite®L-1225L, manufactured by Teijin Chemicals Ltd.) or a polyamide resin (Leona™ 1300S, manufactured by Asahi Kasei Corporation), followed by melt-kneading them with a twin screw vented extruder (TEM35, manufactured by Toshiba Machine Co., Ltd.).

The pellets thus obtained were dried at 120° C. for ten hours, and then used in injection molding, under a prescribed condition, to produce test peaces. Using the test pieces, the volume resistivity and thermal conductivity were determined. The results obtained are shown in Table 5.

TABLE 5

| | Example | | | | | |
|---|---|---|---|---|---|---|
| | 1 | 2 | 3 | 4 | 5 | 6 |
| Polycarbonate | 69 | 60 | 50 | | | |
| Polyamide | | | | 69 | 60 | 50 |
| Carbon fibrous structures of Synthetic Example 1 | 31 | 40 | 50 | 31 | 40 | 50 |
| Volume resistivity (Ω·cm) | 1.6 × 10$^0$ | 1.1 × 10$^0$ | 4.1 × 10$^{-1}$ | 2.1 × 10$^0$ | 1.0 × 10$^0$ | 5.3 × 10$^{-1}$ |
| Thermal conductivity (W/m·K) | 3.9 | 4.3 | 5.8 | 4.1 | 4.8 | 6.1 |

Examples 7-12

Test peaces were produced in the same procedure as in Examples 1-6 except that carbon fibrous structures synthesized in Synthetic Example 2 were used instead of the carbon fibrous structures synthesized in Synthetic Example 1. Using the test pieces, the volume resistivity and thermal conductivity were determined. The results obtained are shown in Table 6.

TABLE 6

| | Example | | | | | |
|---|---|---|---|---|---|---|
| | 7 | 8 | 9 | 10 | 11 | 12 |
| Polycarbonate | 69 | 60 | 50 | | | |
| Polyamide | | | | 69 | 60 | 50 |
| Carbon fibrous structures of Synthetic Example 2 | 31 | 40 | 50 | 31 | 40 | 50 |
| Volume resistivity (Ω·cm) | 1.2 × 10$^0$ | 9.8 × 10$^{-1}$ | 3.5 × 10$^{-1}$ | 1.1 × 10$^0$ | 9.5 × 10$^{-1}$ | 3.3 × 10$^{-1}$ |
| Thermal conductivity (W/m·K) | 3.9 | 4.4 | 5.9 | 4.2 | 4.8 | 6.2 |

Controls 1-6

Test peaces were produced in the same procedure as in Examples 1-6 except that carbon black (#3350B, manufactured by Mitsubishi Chemical) was used instead of the carbon fibrous structures synthesized in Synthetic Example 1. Using these test pieces, the volume resistivity and thermal conductivity were determined. The results obtained are shown in Table 7.

| | Control | | | | | |
|---|---|---|---|---|---|---|
| | 1 | 2 | 3 | 4 | 5 | 6 |
| Polycarbonate | 69 | 60 | 50 | | | |
| Polyamide | | | | 69 | 60 | 50 |
| Carbon black | 31 | 40 | 50 | 31 | 40 | 50 |
| Volume resistivity (Ω·cm) | 9.1 × 10$^6$ | 9.5 × 10$^5$ | 8.1 × 10$^5$ | 9.7 × 10$^6$ | 7.8 × 10$^5$ | 9.2 × 10$^5$ |
| Thermal conductivity (W/m·K) | 0.21 | 0.28 | 0.36 | 0.22 | 0.35 | 0.40 |

The invention claimed is:

1. Composite material comprising (a) carbon fibrous structures each of which comprises a three dimensional network of carbon fibers, each of the carbon fibers having an outside diameter of 15-100 nm, wherein the carbon fibrous structure further comprises a granular part, at which the carbon fibers are bound in a state that the carbon fibers are extended outwardly therefrom, and wherein the granular part is produced in a growth process of the carbon fibers, and (b) an material other than the carbon fibrous structures (hereinafter, referred to as "other material"), wherein the amount of carbon fibrous structures added is more than 30% and not more than 100% by weight of the total weight of the composite.

2. The composite material according to claim 1, wherein the carbon fibrous structures may have an area-based circle-equivalent mean diameter of 50-100 μm.

3. The composite material according to claim 1, wherein said carbon fibrous structure has a bulk density of 0.0001-0.05 g/cm$^3$.

4. The composite material according to claim 1, wherein $I_D/I_G$ of said carbon fibrous structure determined by Raman spectroscopy (measured using 514 nm of argon laser) is not more than 0.2.

5. The composite material according to claim 1, wherein said carbon fibrous structure has a combustion initiation temperature in air of not less than 750° C.

6. The composite material according to claim 1, wherein a particle diameter of the granular part is larger than outside diameters of the carbon fibers.

7. The composite material according to claim 1, wherein the carbon fibers are produced using as carbon sources at least two carbon compounds which have different decomposition temperatures.

8. The composite material according to claim 1, wherein the other material comprises an organic polymer.

9. The composite material according to claim 1, wherein the other material comprises an inorganic material.

10. The composite material according to claim 1, wherein the other material comprises a metal.

11. The composite material according to claim 1, wherein the composite material further comprises at least one of filler selected from the group consisting of metallic fine particles, silica, calcium carbonate, magnesium carbonate, carbon black, glass fibers, and carbon fibers.

* * * * *